(12) United States Patent
Shaked et al.

(10) Patent No.: US 12,526,065 B2
(45) Date of Patent: Jan. 13, 2026

(54) TECHNIQUES FOR SENSOR SHARING OF WI-FI INTERFERENCE DETECTION

(71) Applicant: QUALCOMM Incorporated, San Diego, CA (US)

(72) Inventors: Shlomit Shaked, Rosh Haayin (IL); Assaf Touboul, Netanya (IL); Moshe Ben-Ari, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 498 days.

(21) Appl. No.: 18/051,188

(22) Filed: Oct. 31, 2022

(65) Prior Publication Data

US 2024/0146426 A1   May 2, 2024

(51) Int. Cl.
*H04B 17/345* (2015.01)
*H04W 4/40* (2018.01)
*H04W 24/10* (2009.01)

(52) U.S. Cl.
CPC .......... *H04B 17/345* (2015.01); *H04W 24/10* (2013.01); *H04W 4/40* (2018.02)

(58) Field of Classification Search
CPC ....... H04B 17/345; H04W 24/10; H04W 4/40
See application file for complete search history.

(56) References Cited

U.S. PATENT DOCUMENTS

| 2021/0067976 A1* | 3/2021 | Cariou | H04W 84/12 |
| 2021/0219268 A1* | 7/2021 | Li | H04B 17/318 |
| 2022/0407615 A1* | 12/2022 | Ahmad | H04B 17/318 |

* cited by examiner

*Primary Examiner* — Eric Myers
(74) *Attorney, Agent, or Firm* — Dalei Dong; Holland & Hart LLP

(57) ABSTRACT

Methods, systems, and devices for wireless communications are described. Techniques described herein provide for sharing detection of radio frequency interference among user equipments (UEs). If a first UE detects radio frequency interference affecting a vehicle-to-everything (V2X) link, the first UE may transmit a V2X message to a second UE indicating that the first UE detected the radio frequency interference. The second UE may adjust V2X communications in order to compensate for the radio frequency interference or modify radio frequency interference detection schemes.

27 Claims, 12 Drawing Sheets

TECHNIQUES FOR SENSOR SHARING OF WI-FI INTERFERENCE DETECTION

FIELD OF DISCLOSURE

The following relates to wireless communications, including sensor sharing of Wi-Fi interference detection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support sensor sharing of Wi-Fi interference detection. For example, the described techniques provide for sharing detection of radio frequency (RF) interference among user equipments (UEs). If a first UE detects RF interference affecting a vehicle-to-everything (V2X) link, the first UE may transmit a message to a second UE indicating that the first UE detected the RF interference. The second UE may adjust V2X communications in order to compensate for the RF interference or modify RF interference detection scheme.

A method for wireless communications at a first user equipment (UE) is described. The method may include communicating with a second UE via a V2X communication link, detecting RF interference with respect to the V2X communication link, and transmitting, to the second UE via the V2X communication link, a message including an indication of the detected RF interference and an indication of one or more characteristics of the detected RF interference.

An apparatus for wireless communications at a first UE is described. The apparatus may include a processor, memory coupled with the processor, and instructions stored in the memory. The instructions may be executable by the processor to cause the apparatus to communicate with a second UE via a V2X communication link, detect RF interference with respect to the V2X communication link, and transmit, to the second UE via the V2X communication link, a message including an indication of the detected RF interference and an indication of one or more characteristics of the detected RF interference.

Another apparatus for wireless communications at a first UE is described. The apparatus may include means for communicating with a second UE via a V2X communication link, means for detecting RF interference with respect to the V2X communication link, and means for transmitting, to the second UE via the V2X communication link, a message including an indication of the detected RF interference and an indication of one or more characteristics of the detected RF interference.

A non-transitory computer-readable medium storing code for wireless communications at a first UE is described. The code may include instructions executable by a processor to communicate with a second UE via a V2X communication link, detect RF interference with respect to the V2X communication link, and transmit, to the second UE via the V2X communication link, a message including an indication of the detected RF interference and an indication of one or more characteristics of the detected RF interference.

In some examples of the method, apparatuses, and non-transitory computer-readable medium described herein, detecting the interference may include operations, features, means, or instructions for determining that an RF interference strength exceeds a threshold level, and where the one or more characteristics includes the threshold level.

In some examples of the method, apparatuses, and non-transitory computer-readable medium described herein, transmitting the message may include operations, features, means, or instructions for transmitting the message including an indication of an interference detection scheme used to detect the RF interference.

In some examples of the method, apparatuses, and non-transitory computer-readable medium described herein, transmitting the message including the indication of the one or more characteristics may include operations, features, means, or instructions for transmitting the message indicating a time corresponding to detection of the RF interference.

In some examples of the method, apparatuses, and non-transitory computer-readable medium described herein, transmitting the message including the indication of the one or more characteristics may include operations, features, means, or instructions for transmitting the message indicating of a location of the first UE when the RF interference was detected.

In some examples of the method, apparatuses, and non-transitory computer-readable medium described herein, transmitting the message including the indication of the one or more characteristics may include operations, features, means, or instructions for transmitting the message indicating a power, rate, duration, frequency, or combination thereof of the detected RF interference.

In some examples of the method, apparatuses, and non-transitory computer-readable medium described herein, transmitting the message may include operations, features, means, or instructions for broadcasting the message.

In some examples of the method, apparatuses, and non-transitory computer-readable medium described herein, transmitting the message may include operations, features, means, or instructions for unicasting the message to the second UE.

Some examples of the method, apparatuses, and non-transitory computer-readable medium described herein may further include operations, features, means, or instructions for adjusting communications via the V2X communication link based on detecting the RF interference.

In some examples of the method, apparatuses, and non-transitory computer-readable medium described herein, adjusting communications via the V2X communication link may include operations, features, means, or instructions for decreasing a threshold sensitivity level associated with an interference detection scheme.

In some examples of the method, apparatuses, and non-transitory computer-readable medium described herein, adjusting communications via the V2X communication link may include operations, features, means, or instructions for selecting a modulation and decoding scheme for the V2X communication link.

Some examples of the method, apparatuses, and non-transitory computer-readable medium described herein may further include operations, features, means, or instructions for receiving, prior to detecting the RF interference, a second message from one of the second UE or a third UE indicating that the one of the second UE or the third UE detected RF interference with the V2X communication link and decreasing a threshold level associated with detection of RF interference, where detecting the RF interference includes detecting RF interference in accordance with the decreased threshold level.

In some examples of the method, apparatuses, and non-transitory computer-readable medium described herein, the RF interference may be detected within a bandwidth of the V2X communication link from an emission outside of the bandwidth.

A method for wireless communications at a second UE is described. The method may include communicating with a first UE via a V2X communication link, receiving, from the first UE via the V2X communication link, a message including an indication of detected RF interference with the V2X communication link at the first UE and an indication of one or more characteristics of the detected RF interference, and adjusting communications via the V2X communication link based on the message.

An apparatus for wireless communications at a second UE is described. The apparatus may include a processor, memory coupled with the processor, and instructions stored in the memory. The instructions may be executable by the processor to cause the apparatus to communicate with a first UE via a V2X communication link, receive, from the first UE via the V2X communication link, a message including an indication of detected RF interference with the V2X communication link at the first UE and an indication of one or more characteristics of the detected RF interference, and adjust communications via the V2X communication link based on the message.

Another apparatus for wireless communications at a second UE is described. The apparatus may include means for communicating with a first UE via a V2X communication link, means for receiving, from the first UE via the V2X communication link, a message including an indication of detected RF interference with the V2X communication link at the first UE and an indication of one or more characteristics of the detected RF interference, and means for adjusting communications via the V2X communication link based on the message.

A non-transitory computer-readable medium storing code for wireless communications at a second UE is described. The code may include instructions executable by a processor to communicate with a first UE via a V2X communication link, receive, from the first UE via the V2X communication link, a message including an indication of detected RF interference with the V2X communication link at the first UE and an indication of one or more characteristics of the detected RF interference, and adjust communications via the V2X communication link based on the message.

Some examples of the method, apparatuses, and non-transitory computer-readable medium described herein may further include operations, features, means, or instructions for detecting RF interference with the V2X communication link, where adjusting communications may be based on detecting the RF interference.

In some examples of the method, apparatuses, and non-transitory computer-readable medium described herein, receiving the message including the indication of the one or more characteristics may include operations, features, means, or instructions for receiving the message indicating a threshold level for detection of the RF interference at the first UE.

In some examples of the method, apparatuses, and non-transitory computer-readable medium described herein, receiving the message may include operations, features, means, or instructions for receiving the message including an indication of an interference detection scheme used to detect the RF interference.

In some examples of the method, apparatuses, and non-transitory computer-readable medium described herein, receiving the message including the indication of the one or more characteristics may include operations, features, means, or instructions for receiving the message indicating a time corresponding to detection of the RF interference.

In some examples of the method, apparatuses, and non-transitory computer-readable medium described herein, receiving the message including the indication of the one or more characteristics may include operations, features, means, or instructions for receiving the message indicating of a location of the first UE when the RF interference was detected.

In some examples of the method, apparatuses, and non-transitory computer-readable medium described herein, receiving the message including the indication of the one or more characteristics may include operations, features, means, or instructions for receiving the message indicating a power, rate, duration, frequency, or combination thereof of the detected RF interference.

In some examples of the method, apparatuses, and non-transitory computer-readable medium described herein, adjusting communications via the V2X communication link may include operations, features, means, or instructions for decreasing a threshold sensitivity level associated with an interference detection scheme.

In some examples of the method, apparatuses, and non-transitory computer-readable medium described herein, adjusting communications via the V2X communication link may include operations, features, means, or instructions for selecting a modulation and decoding scheme for the V2X communication link.

In some examples of the method, apparatuses, and non-transitory computer-readable medium described herein, the RF interference may be detected within a bandwidth of the V2X communication link from an emission outside of the bandwidth.

DETAILED DESCRIPTION

Figure 1:
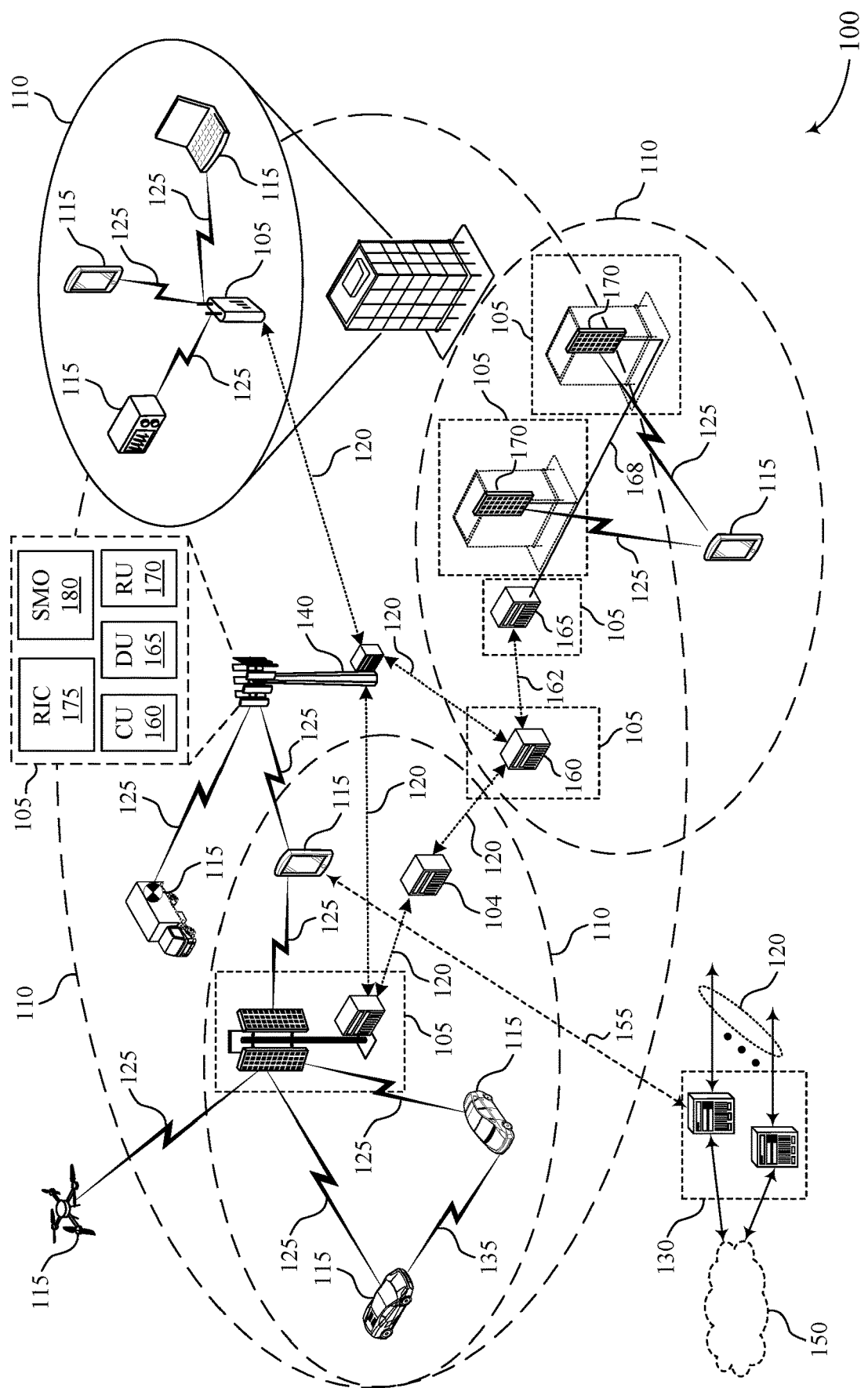
FIG. 1 illustrates an example of a wireless communications system that supports sensor sharing of Wi-Fi interference detection in accordance with one or more aspects of the present disclosure.

Some vehicles may be equipped with on-board transceivers to enable wireless communications with other vehicles or devices. Such wireless communications may include, for example, communication of vehicle-to-everything (V2X) signals. V2X signals may be used to implement vehicle safety features or for autonomous vehicle operation. V2X signals may include cellular V2X (C-V2X) signals, which may include radio signals used to share safety information, such as velocity, direction, acceleration, or other information, among vehicles and with roadside infrastructure, such a roadside units (RSUs). C-V2X may function as an additional safety sensor for a vehicle.

The C-V2X radio frequency (RF) spectrum band is located at a 5.9 GHz carrier band, adjacent to RF spectrum bands for a wireless local area network (WLAN), such as a wireless fidelity (Wi-Fi) (i.e., Institute of Electrical and Electronics Engineers (IEEE) 802.11) network. For example, the 5.9 GHz carrier band is located adjacent to the Unlicensed National Information Infrastructure (UNII) 3/4 bands on one side and the UNII 5 band on the other side. UNII 3/4 and UNII 5 may both be used for Wi-Fi communications. Wi-Fi communications in the UNII 3/4 and UNII 5 bands may be bursty and may be transmitted with low mask requirements. Such Wi-Fi transmissions, as well as other out of band (OOB) emissions, may be received by C-V2X transceivers as RF interference, thereby causing a high interference to noise ratio (INR) for the C-V2X communications. High INR caused by Wi-Fi, other OOB emissions, and other undesirable interferer may lower the sensor sensitivity of the C-V2X receiver and the ability of a user equipment (UE) to decode the C-V2X messages (e.g., safety messages). UEs may use several schemes to detect RF interference, and particularly Wi-Fi interference, such as a Wi-Fi preamble correlator, comparing received signal strength indicator (RSSI) variations over time, or a specialized Wi-Fi sensor or device.

Detection of RF interference, and particularly detection of interference caused by Wi-Fi, may be enhanced by sharing RF interference detection among vehicles (e.g., UEs). For example, if a UE detects RF interference affecting a C-V2X link, the UE may transmit a message via the C-V2X link to one or more other UEs indicating that the UE detected the RF interference. The other UEs may then adjust C-V2X communications in order to compensate for the interference and/or modify their own RF interference detection schemes. For example, if the UE receives an indication that another UE detected RF interference, the receiving UE may change data modulation and/or encoding schemes to enhance C-V2X performance in the presence of RF interference. As another example, if the UE receives an indication that another UE detected RF interference, the receiving UE may modify thresholds (e.g., RSSI thresholds) for detecting RF interference at the receiving UE. Accordingly, sharing of RF interference detection information between UEs may enable the UEs to efficiently detect RF interference. Additionally, the UE may manage and mitigate the RF interference influence to avoid C-V2X performance degradation.

Aspects of the disclosure are initially described in the context of wireless communications systems. Additional aspects of the disclosure are described in the context of wireless communications systems, an example RF spectrum diagram, and an example process flow. Aspects of the disclosure are further illustrated by and described with reference to apparatus diagrams, system diagrams, and flowcharts that relate to sensor sharing of Wi-Fi interference detection.

FIG. 1 illustrates an example of a wireless communications system 100 that supports sensor sharing of Wi-Fi interference detection in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., an RF access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support sensor sharing of Wi-Fi interference detection as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of an RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as RSUs, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some UEs 115 may be vehicles be equipped with onboard transceivers to enable wireless communications with other vehicles or devices (e.g., UEs 115). Such wireless communications may include, for example, communication of V2X signals. V2X signals may be used to implement vehicle safety features or for autonomous vehicle operation. V2X signals may include C-V2X signals, which may include radio signals used to share safety information among vehicles (e.g., UEs 115) and roadside infrastructure (e.g., RSUs), such as velocity, direction, acceleration, or other information.

The C-V2X RF spectrum band is located at a 5.9 GHz carrier, adjacent to RF spectrum bands for a Wi-Fi network. For example, the 5.9 GHz carrier band is located adjacent to the UNII 3/4 bands on one side and the UNII 5 band on the other side. UNII 3/4 and UNII 5 may both be used for Wi-Fi communications. Wi-Fi communications in the UNII 3/4 and UNII 5 bands may be bursty and may be transmitted with low mask requirements. Such Wi-Fi transmissions, as well as other OOB emissions, may be received by C-V2X transceivers as RF interference, thereby causing a high INR for the C-V2X communications. High INR caused by Wi-Fi, other OOB emissions, and other undesirable interferer may lower the sensor sensitivity of the C-V2X receiver and the ability of a UE 115 to decode the C-V2X messages (e.g., safety messages). UEs 115 may use several schemes to detect RF interference, and particularly Wi-Fi interference, such as a Wi-Fi preamble correlator, comparing the RSSI variations over time, or a specialized Wi-Fi sensor or device.

Detection of RF interference, and particularly detection of interference caused by Wi-Fi, may be enhanced by sharing RF interference detection among vehicles (e.g., UEs 115). For example, if a UE 115 detects RF interference affecting a C-V2X link, the UE 115 may transmit a message via the C-V2X link to one or more other UEs 115 indicating that the UE 115 detected the RF interference. The other UEs 115 may then adjust C-V2X communications in order to compensate for the RF interference and/or modify their own RF interference detection schemes. For example, if the UE 115 receives an indication that another UE 115 detected RF interference, the receiving UE 115 may change data modulation and/or encoding schemes to enhance C-V2X performance in the presence of interference. As another example, if the UE 115 receives an indication that another UE 115 detected interference, the receiving UE 115 may modify thresholds (e.g., RSSI thresholds) for detecting interference at the receiving UE 115. Accordingly, sharing of RF interference detection information between UEs 115 may enable the UEs 115 to efficiently detect RF interference. Additionally, the UEs 115 may manage and mitigate the RF interference influence to avoid C-V2X performance degradation.

Figure 2:
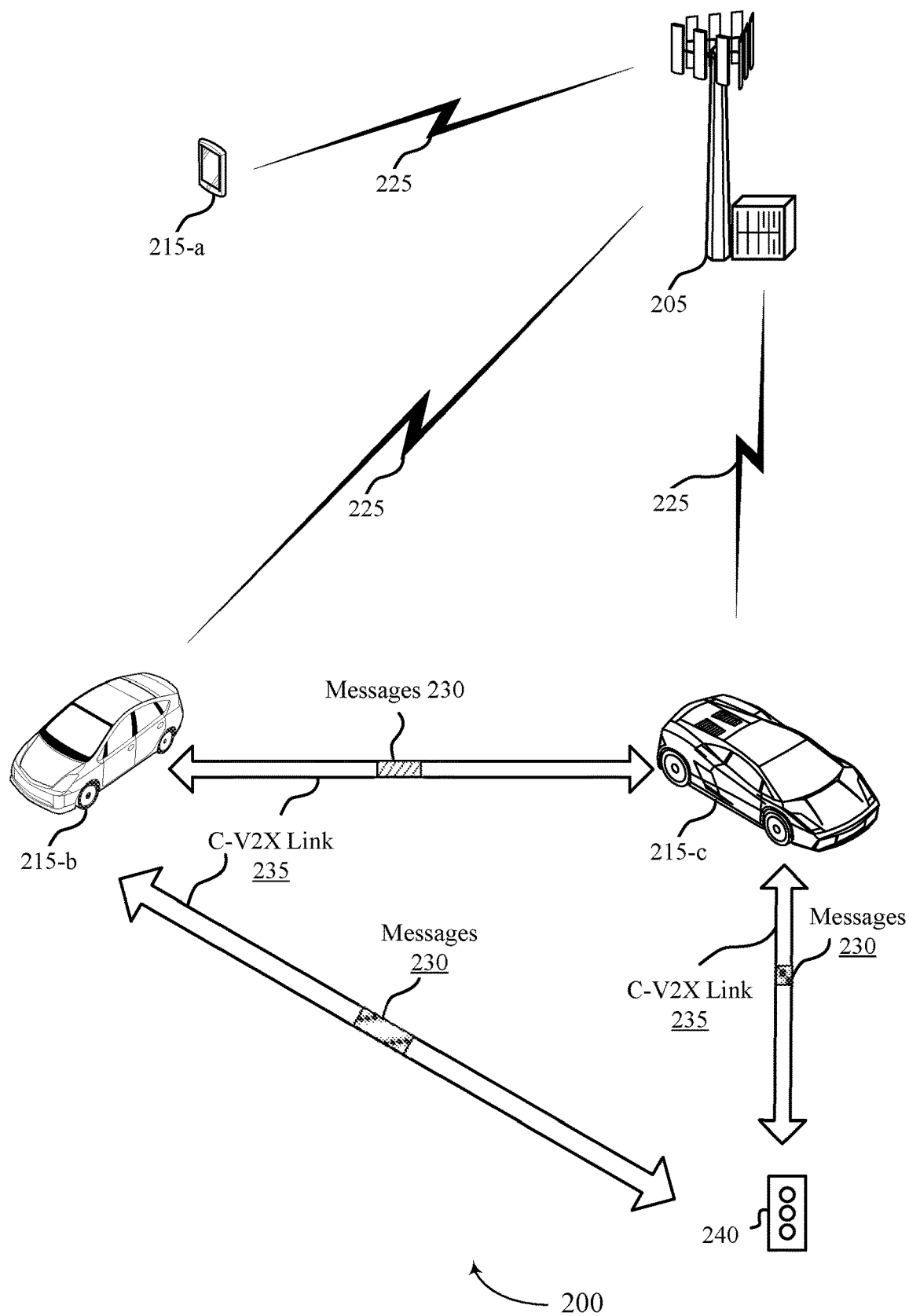
FIG. 2 illustrates an example of a wireless communications system that supports sensor sharing of Wi-Fi interference detection in accordance with one or more aspects of the present disclosure.

FIG. 2 illustrates an example of a wireless communications system 200 that supports sensor sharing of Wi-Fi interference detection in accordance with one or more aspects of the present disclosure. In some examples, wireless communications system 200 may implement aspects of wireless communications system 100. Wireless communications system 200 may include a network entity 205 and UEs 215-*a*, 215-*b* and 215-*c*, which may be examples of corresponding network entities 105 and UEs 115, respectively, as described herein with reference to FIG. 1.

In some examples, a UE 215-*a* may communicate with a network entity 205 (e.g., an access point that operates in accordance with Wi-Fi or a network entity that operates in accordance with some other radio access technologies) via a communication link 225. UEs 215-*b* and 215-*c* (e.g., vehicles) may communicate with the network entity 205 via the communication links 225.

In some examples, the UE 215-*b* and the UE 215-*c* may communicate via a C-V2X links 235. For example, the UE 215-*b* may transmit C-V2X messages 230 to the UE 215-*c*, and the UE 215-*b* may receive C-V2X messages 230 from the UE 215-*c*. In some examples, the UEs 215-*b* and 215-*c* may communicate C-V2X messages 230 via a C-V2X link 235 with a RSU 240. The C-V2X messages 230 may provide shared safety information among the UEs 215-*b* and 215-*c* and/or the RSU 240, such as velocity, direction, acceleration, or other information. The C-V2X messages 230 may be considered as an additional safety sensor for the UEs 215-*b* and 215-*c* and the RSU 240. The C-V2X links may operate in the 5.9 carrier band.

In some examples, a transmission from the network entity 205 (e.g., a WLAN access point (AP)) or from the UE 215-*a* may interfere with the C-V2X communications between UE 215-*b* and UE 215-*c* on the C-V2X link 235 and/or with the C-V2X communications between UEs 215-*b* and 215-*c* and RSU 240 on the C-V2X link 235. The interfering transmission may be transmitted to the UE 215-*b*, UE 215-*c* or to another UE 215-*a*. For example, the UE 215-*a* may be located within the vehicle or close to the UE 215-*b*, and the UE 215-*a* may exchange transmissions with the network entity 205 via one or more RF spectrum bands used for the WLAN RAT (e.g., one or more Wi-Fi channels).

Figure 3:
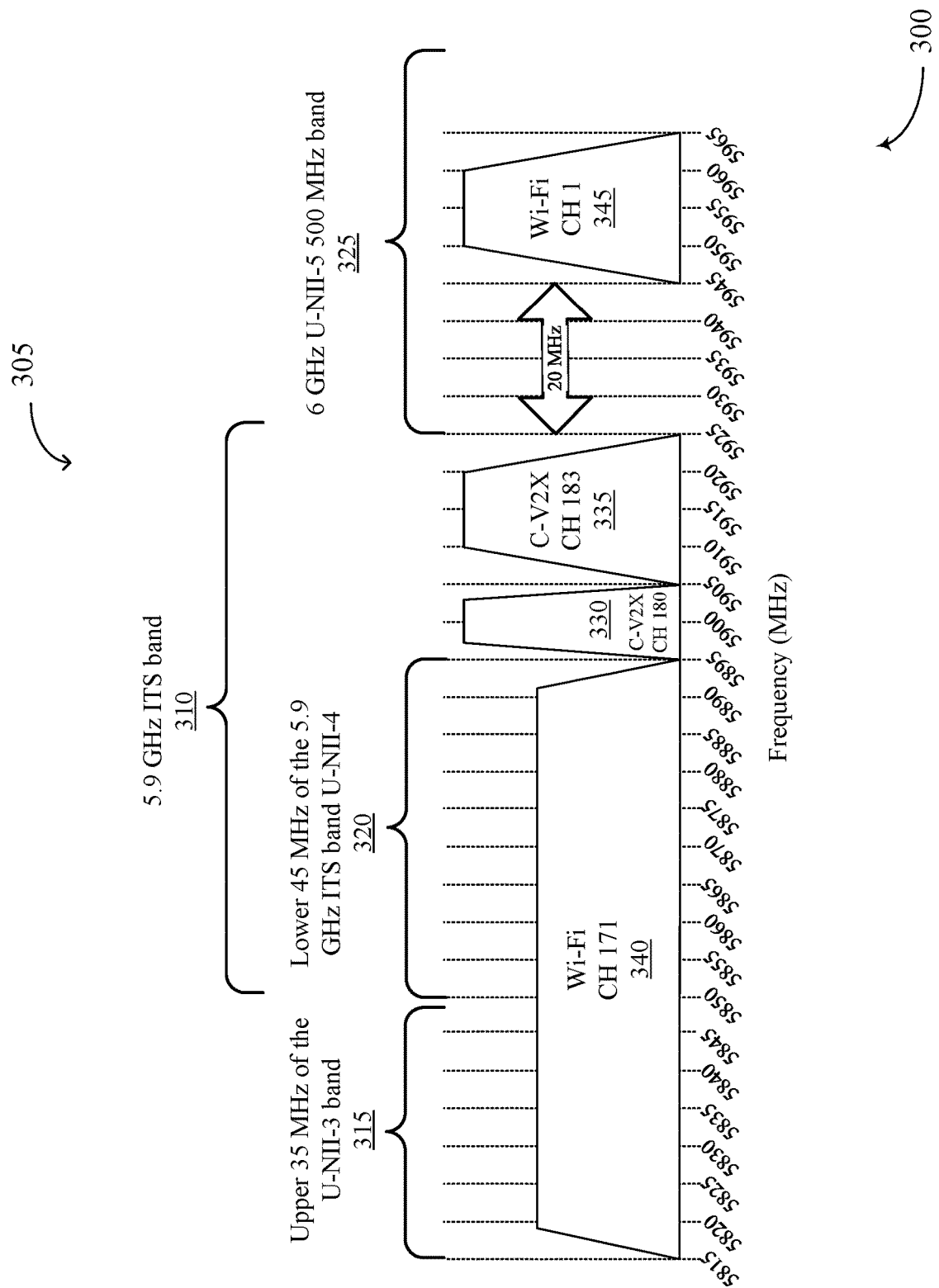
FIG. 3 illustrates an example of a radio frequency spectrum diagram that supports sensor sharing of Wi-Fi interference detection in accordance with one or more aspects of the present disclosure.

FIG. 3 illustrates an example of an RF spectrum diagram 300 that supports sensor sharing of Wi-Fi interference detection in accordance with one or more aspects of the present disclosure. In some examples, network entities 105 and 205 and the UEs 115, 215-*a*, 215-*b* and 215-*c* of the wireless communications system 100 of FIG. 1 and wireless communications system 200 of FIG. 2 may operate in the RF spectrum 305 illustrated in FIG. 3.

In some examples, the C-V2X link 235 may operate in a 5.9 GHz Intelligent Transport System (ITS) RF spectrum band 310. The 5.9 GHz ITS RF spectrum band 310 extends from 5850 MHz to 5925 MHz. The 5.9 GHz ITS RF spectrum band 310 is located adjacent to an UNII 3 RF spectrum band 315, UNII 4 RF spectrum band 320, and UNII 5 RF spectrum band 325.

As illustrated in FIG. 3, the C-V2X channel 183 330 neighbors a Wi-Fi channel 171 340 (in the UNII 3 spectrum band 315 and UNII 4 RF spectrum band 320), and a C-V2X channel 183 335 neighbors a Wi-Fi channel 1 345 (in the UNII 5 RF spectrum band 325) with a 20 MHz separation. The UNII 4 spectrum band 320 may be located in the lower 45 MHz of the 5.9 GHz ITS band 310. Both of these Wi-Fi channels 340 and 345 are used for Wi-Fi bursty transmissions with low transmission mask requirements. Such Wi-Fi transmissions, as well as other OOB emissions, may be received by C-V2X transceivers of the UEs 215-*b* and 215-*c* as RF interference, thereby causing a high INR for the C-V2X communications. In some examples, the power level of the RF interference may be −5 decibel-milliwatts (dBm)/MHz at 5895 MHz, −27 dbM/MHz at frequencies greater than or equal to 5925 MHz or −37 dBm/MHz at frequencies less than 5925 MHz. As a result of the RF interference, the performance of the C-V2X transceivers may be degraded with lower sensor sensitivity, and the ability to decode the C-V2X messages 215 may be reduced. In some examples, auto makers may request sensor validity indication from the C-V2X transceiver to alert other vehicle systems when such RF interference exists.

In some examples, UE 215-*b* and 215-*c*, as described with reference to FIG. 2, may use several schemes to detect RF interference, and particularly Wi-Fi interference. One example scheme for detecting Wi-Fi interference is a Wi-Fi preamble correlator. However, since the Wi-Fi signal is OOB, the Wi-Fi preamble correlator scheme may not be used efficiently for the detection of the interference. Additionally, detecting the Wi-Fi interference using the Wi-Fi preamble correlator scheme may be complicated, consume a large amount of power, and may result in delays of the communication between UE 215-*b* and 215-*c*. In some examples, the Wi-Fi preamble correlator scheme may be performed in hardware that is not readily available on the C-V2X transceivers of the UEs 215-*b* and 215-*c*.

Another example scheme for detecting Wi-Fi interference and other undesirable interference may be a method that identifies bursty interference by identifying an increase or decrease of RSSI over time, such as per symbol. In this example interference detection scheme, the RSSI difference between two consecutive symbols may be compared to a pre-configured threshold for detecting significant change. However, the increase or decrease of the RSSI may frequently occur in C-V2X signals in dynamic channels, such as in a vehicle environment, and high thresholds may be involved which lower the interference detection performance.

Another example scheme for detecting Wi-Fi interference may be a specialized Wi-Fi sensor or Wi-Fi device. In some examples, a Wi-Fi device may be on-board the vehicle (UE 215-*b* or UE 215-*c*), and the Wi-Fi device may be used to detect Wi-Fi interference. For example, if the Wi-Fi device from the vehicle starts to transmit, this indication of Wi-Fi transmissions from the Wi-Fi device on-board the UE 215-*b* or 215-*c* may be used as a detection of Wi-Fi interference.

Figure 4:
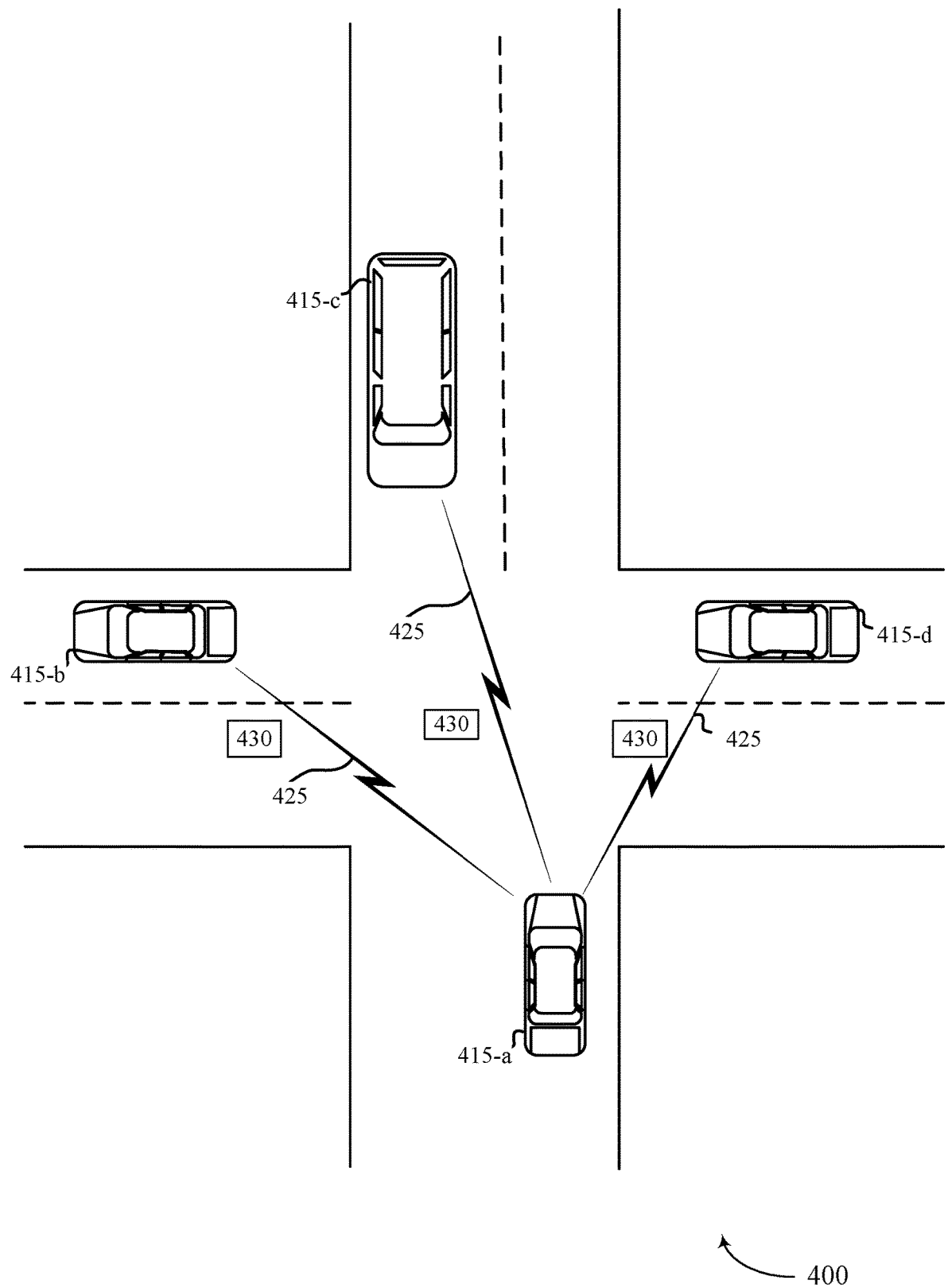
FIG. 4 illustrates an example of a wireless communications system that supports sensor sharing of Wi-Fi interference detection in accordance with one or more aspects of the present disclosure.

FIG. 4 illustrates an example of a wireless communications system 400 that supports sensor sharing of Wi-Fi interference detection in accordance with one or more aspects of the present disclosure. Wireless communications system 400 may include UEs 415-*a*, 415-*b*, 415-*c* and 415-*d*, which may be examples of UEs 115 and 215, as described herein with reference to FIGS. 1 and 2.

In some examples, RF interference detection, and particularly detection of interference caused by Wi-Fi, may be enhanced by sharing interference detection among UEs, for example two or more of UEs 415-*a*, 415-*b*, 415-*c* and 415-*d*. For example, if the UE 415-*a* detects RF interference affecting the C-V2X communication link 425, the UE 415-*a* may transmit a message 430 to one or more other UEs 415-*b*, 415-c and 415-d in the near neighborhood indicating that the UE 415-a detected the RF interference. In some examples, the message 430 may be a C-V2X message, and the message 430 may indicate that the UE 415-a has detected RF interference in the vicinity. In some examples, the UE 415-a may broadcast the message to the UEs 415-b, 415-c and 415-d. In another example, the UE 415-a may unicast the message to one of the UEs 415-b, 415-c or 415-d.

In some examples, the content of the message 430 may include an indication of the detected RF interference and one or more characteristics of the detected RF interference. For example, the content of the message 430 may include a time stamp corresponding to the time of detection of the RF interference by the UE 415-a. In another example, the content of the message 430 may include a location of the UE 415-a when the RF interference was detected. The content of the message 430 may include an indication of an interference detection scheme used by the UE 415-a to detect the RF interference. In some examples, the content of the message 430 may include an indication of a threshold for the increase or decrease of RSSI over time that was used to detect the interference by the UE 415-a. In another example, the content of the message 430 may include characteristics of the identified RF interference including an estimated power, rate, duration, frequency, or combination thereof of the detected RF interference.

In some examples, the UEs 415-b, 415-c and/or 415-d that receive the message 430 with indication of detected RF interference may use the information provided in the message 430 to improve C-V2X communications in order to compensate for the interference or modify their own RF interference detection schemes. For example, if the UEs 415-b receives an indication that the UE 415-a detected RF interference, the UE 415-b may adjust communications via the C-V2X communication link 425. In some examples, the UE 415-b may increase the sensitivity level associated with reception of messages via the C-V2X communication link 425.

In some examples, the UEs 415-b, 415-c and 415-d that receive the message 430 with indication of detected RF interference may use the information provided in the message 430 to modify the thresholds and logics of their own RF interference detection schemes. For example, if the UEs 415-b receives an indication that the UE 415-a detected RF interference in the vicinity, the UE 415-b may temporarily decrease the interference detection thresholds for the increase or decrease of RSSI over time to detect the RF interference. For example, both the UE 415-a and UE 415-b detecting interference with a similar pattern may improve the RF interference detection reliability that the detected interference indicates real RF interference and not a false alarm.

In some examples, when the UEs 415-b, 415-c and 415-d receive the message 430 with indication of detected RF interference in the vicinity, the UEs 415-b, 415-c and/or 415-d may use the information provided in the message 430 to select a modulation and decoding scheme for enhancing the C-V2X communications link 425 performance in the presence of the detected interference. The UEs 415-b, 415-c and/or 415-d may transmit the messages 430 in a more robust modulation scheme, which will enable the other UEs 415-a, 415-b, 415-c and 415-d to be able to decode the messages 430 in the presence of the detected RF interference. In some examples, the UEs 415-b, 415-c and/or 415-d may adjust their demodulation techniques for a location in which the RF interference was detected. For example, the UE 415-b, 415-c or 415-d may temporarily use higher power consuming or higher processing resources consuming demodulation techniques at the indicated location in the cost of temporary less processing of voice or data.

The sharing of RF interference detection among UEs 415-a, 415-b, 415-c and/or 415-d may provide two levels of RF interference detection: a self-sensor and a sharing sensor. The self-sensor being the RF detection schemes on board the UEs 415-a, 415-b, 415-c and 415-d (e.g., Wi-Fi preamble correlator, comparing the RSSI variations over time, and others), and the sharing sensor being the message 430 indicating detected RF interference by another UE 415-a, 415-b, 415-c or 415-d.

By sharing the indication of Wi-Fi interference detection, the probability of interference detection may increase and reliability of interference detection may increase. Therefore, more UEs 415-a, 415-b, 415-c and 415-d may be aware of RF interference in their surroundings and may respond accordingly to compensate for the interference. The sharing of interference detection may improve sensitivity to detecting interference and may reduce false alarm rates while increasing the RF detection performance of the UE 415-a, 415-b, 415-c or 415-d. Additionally, the sharing of RF interference detection may increase the robustness of the C-V2X communications and may increase the C-V2X communications immunity to RF interference. The shared RF detection message may allow the UE 415-a, 415-b, 415-c or 415-d to be aware of probable interference and proactively adjust the modulation/demodulation technique to mitigate the degradation that caused by the interference. Accordingly, sharing of interference detection information may enable the UEs 415-a, 415-b, 415-c and 415-d to detect interference more quickly and efficiently manage interference to avoid performance degradation. Additionally, sharing of interference detection information may improve C-V2X sensitivity, and accordingly approaching vehicles or other safety information may be noticed ahead of time.

Figure 5:
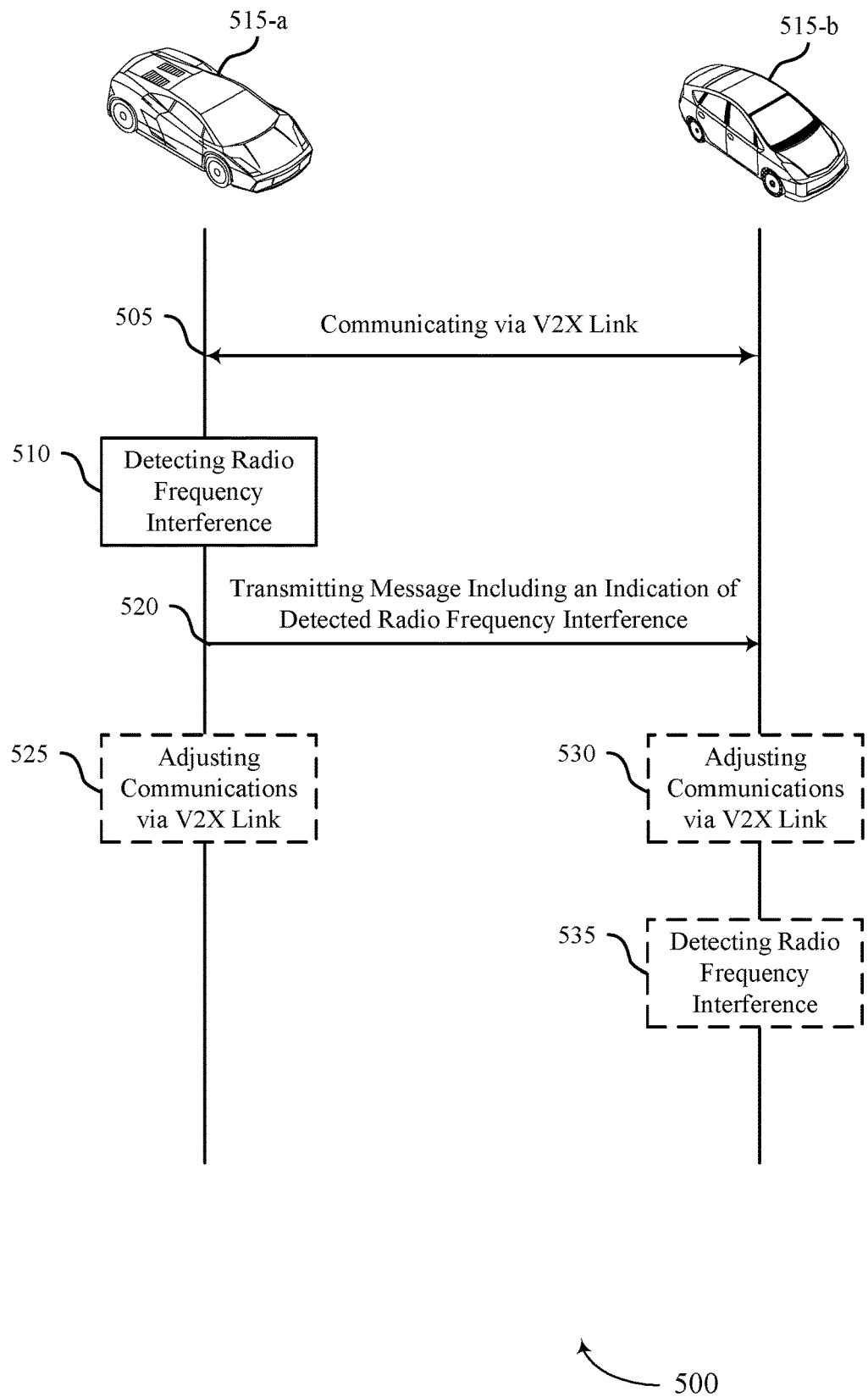
FIG. 5 illustrates an example of a process flow that supports sensor sharing of Wi-Fi interference detection in accordance with one or more aspects of the present disclosure.

FIG. 5 illustrates an example of a process flow 500 that supports sensor sharing of Wi-Fi interference detection in accordance with one or more aspects of the present disclosure. The process flow may include a first UE 515-a and a second UE 515-b, which may be an example of UEs 115, 215, 415 described herein. In the following description of the process flow 500, the operations between the first UE 515-a and the second UE 515-b may be transmitted in a different order than the example order shown, or the operations performed by the first UE 515-a and the second UE 515-b may be performed in different orders or at different times. Some operations may also be omitted from the process flow 500, and other operations may be added to the process flow 500.

At 505, the first UE 515-a may communicate with the second UE 515-b via a V2X communication link, such as a C-V2X communication link. At 510, the first UE 515-a may detect RF interference with respect to the V2X communication link. At 520, the first UE 515-a may transmit, to the second UE 515-b via the V2X communication link, a message including an indication of the detected RF interference and an indication of one or more characteristics of the detected RF interference.

At 525, the first UE 515-a may adjust communications via the V2X communication link based at least in part on detecting the RF interference. In some examples, to adjust communications via the V2X communication link, the first UE 515-a may decrease a threshold sensitivity level associated with an interference detection scheme. In some examples, to adjust communications via the V2X communication link, the first UE 515-*a* may select a more robust modulation and decoding scheme for the V2X communication link.

At 530, the second UE 515-*b* may adjust communications via the V2X communication link. In some examples, to adjust communications via the V2X communication link, the second UE 515-*b* may decrease a threshold sensitivity level associated with an interference detection scheme. In some examples, to adjust communications via the V2X communication link, the second UE 515-*b* may select a more robust modulation and decoding scheme for the V2X communication link. At 535, the second UE 515-*b* may detect RF interference with the V2X communication link.

In some examples, to detect the RF interference, the first UE 515-*a* may determine that a detected strength of the RF interference exceeds a threshold level. In some examples, the one or more characteristics of the detected RF interference may include the threshold level. In some examples, to transmit the message, the first UE 515-*a* may transmit the message including an indication of an interference detection scheme used to detect the RF interference.

In some examples, to transmit the message including the indication of the one or more characteristics of the detected RF interference, the first UE 515-*a* may transmit the message indicating a time corresponding to detection of the RF interference. In some examples, to transmit the message including the indication of the one or more characteristics of the detected RF interference, the first UE 515-*a* may transmit the message indicating a location of the first UE 515-*a* when the RF interference was detected. In some examples, to transmit the message including the indication of the one or more characteristics of the detected RF interference, the first UE 515-*a* may transmit the message indicating a power, rate, duration, frequency, or combination thereof of the detected RF interference.

In some examples, to transmit the message, the first UE 515-*a* may broadcast the message. In some examples, to transmit the message, the first UE 515-*a* may unicast the message to the second UE 515-*b*.

In some examples, the first UE 515-*a* may receive, prior to detecting the RF interference, a second message from one of the second UE 515-*b* or a third UE indicating that the one of the second UE 515-*b* or the third UE detected RF interference with the V2X communication link. The first UE 515-*a* may decrease a threshold level associated with detection of RF interference. In some examples, the first UE 515-*a* may detect RF interference at 510 in accordance with the decreased threshold level.

In some examples, the RF interference is detected within a frequency spectrum bandwidth of the V2X communication link from an emission outside of the frequency spectrum bandwidth and from other undesirable interference within the bandwidth.

Figure 6:
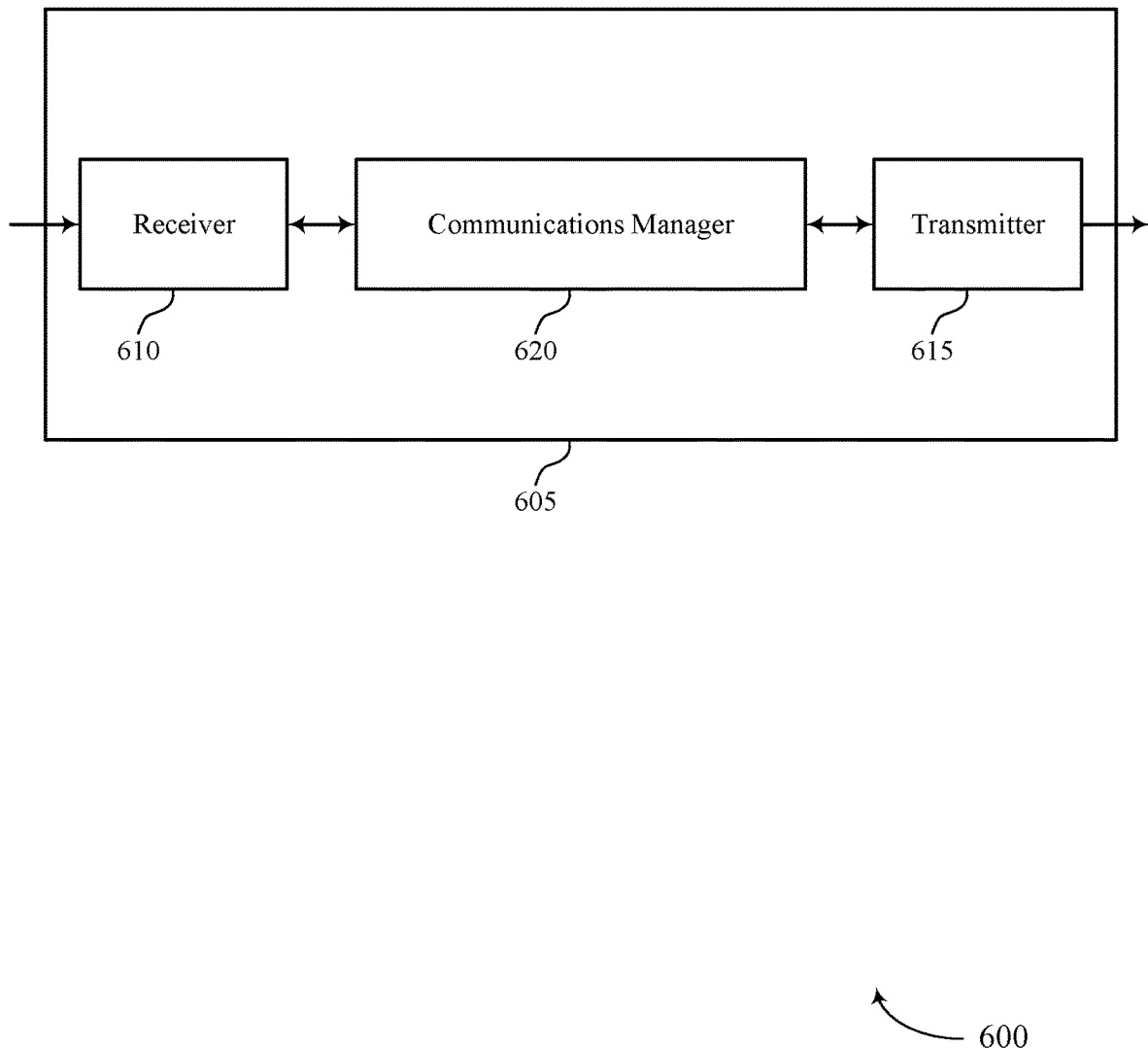
FIGS. 6 and 7 illustrate block diagrams of devices that support sensor sharing of Wi-Fi interference detection in accordance with one or more aspects of the present disclosure.

FIG. 6 illustrates a block diagram 600 of a device 605 that supports sensor sharing of Wi-Fi interference detection in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to sensor sharing of Wi-Fi interference detection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to sensor sharing of Wi-Fi interference detection). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of sensor sharing of Wi-Fi interference detection as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a first UE in accordance with examples as disclosed herein. For example, the communications manager 620 may be configured as or otherwise support a means for communicating with a second UE via a V2X communication link. The communications manager 620 may be configured as or otherwise support a means for detecting RF interference with respect to the V2X communication link. The communications manager 620 may be configured as or otherwise support a means for transmitting, to the second UE via the V2X communication link, a message including an indication of the detected RF interference and an indication of one or more characteristics of the detected RF interference.

Additionally, or alternatively, the communications manager 620 may support wireless communications at a second UE in accordance with examples as disclosed herein. For example, the communications manager 620 may be configured as or otherwise support a means for communicating with a first UE via a V2X communication link. The communications manager 620 may be configured as or otherwise support a means for receiving, from the first UE via the V2X communication link, a message including an indication of detected RF interference with respect to the V2X communication link at the first UE and an indication of one or more characteristics of the detected RF interference. The communications manager 620 may be configured as or otherwise support a means for adjusting communications via the V2X communication link based on the message.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing, reduced power consumption, more efficient utilization of communication resources.

Figure 7:
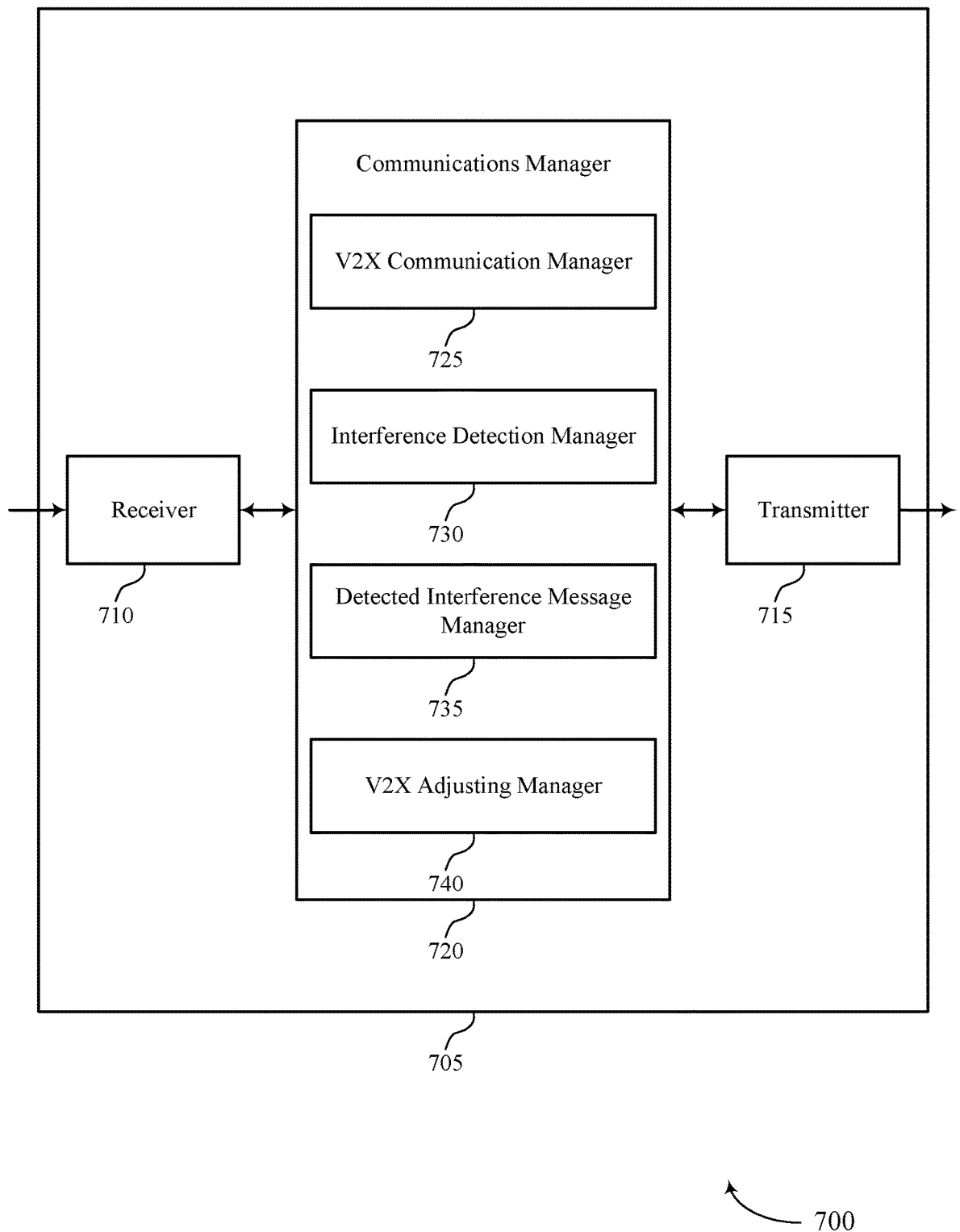

FIG. 7 illustrates a block diagram 700 of a device 705 that supports sensor sharing of Wi-Fi interference detection in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to sensor sharing of Wi-Fi interference detection). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to sensor sharing of Wi-Fi interference detection). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of sensor sharing of Wi-Fi interference detection as described herein. For example, the communications manager 720 may include a V2X communication manager 725, an interference detection manager 730, a detected interference message manager 735, a V2X adjusting manager 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first UE in accordance with examples as disclosed herein. The V2X communication manager 725 may be configured as or otherwise support a means for communicating with a second UE via a V2X communication link. The interference detection manager 730 may be configured as or otherwise support a means for detecting RF interference with respect to the V2X communication link. The detected interference message manager 735 may be configured as or otherwise support a means for transmitting, to the second UE via the V2X communication link, a message including an indication of the detected RF interference and an indication of one or more characteristics of the detected RF interference.

Additionally, or alternatively, the communications manager 720 may support wireless communications at a second UE in accordance with examples as disclosed herein. The V2X communication manager 725 may be configured as or otherwise support a means for communicating with a first UE via a V2X communication link. The detected interference message manager 735 may be configured as or otherwise support a means for receiving, from the first UE via the V2X communication link, a message including an indication of detected RF interference with respect to the V2X communication link at the first UE and an indication of one or more characteristics of the detected RF interference. The V2X adjusting manager 740 may be configured as or otherwise support a means for adjusting communications via the V2X communication link based on the message.

Figure 8:
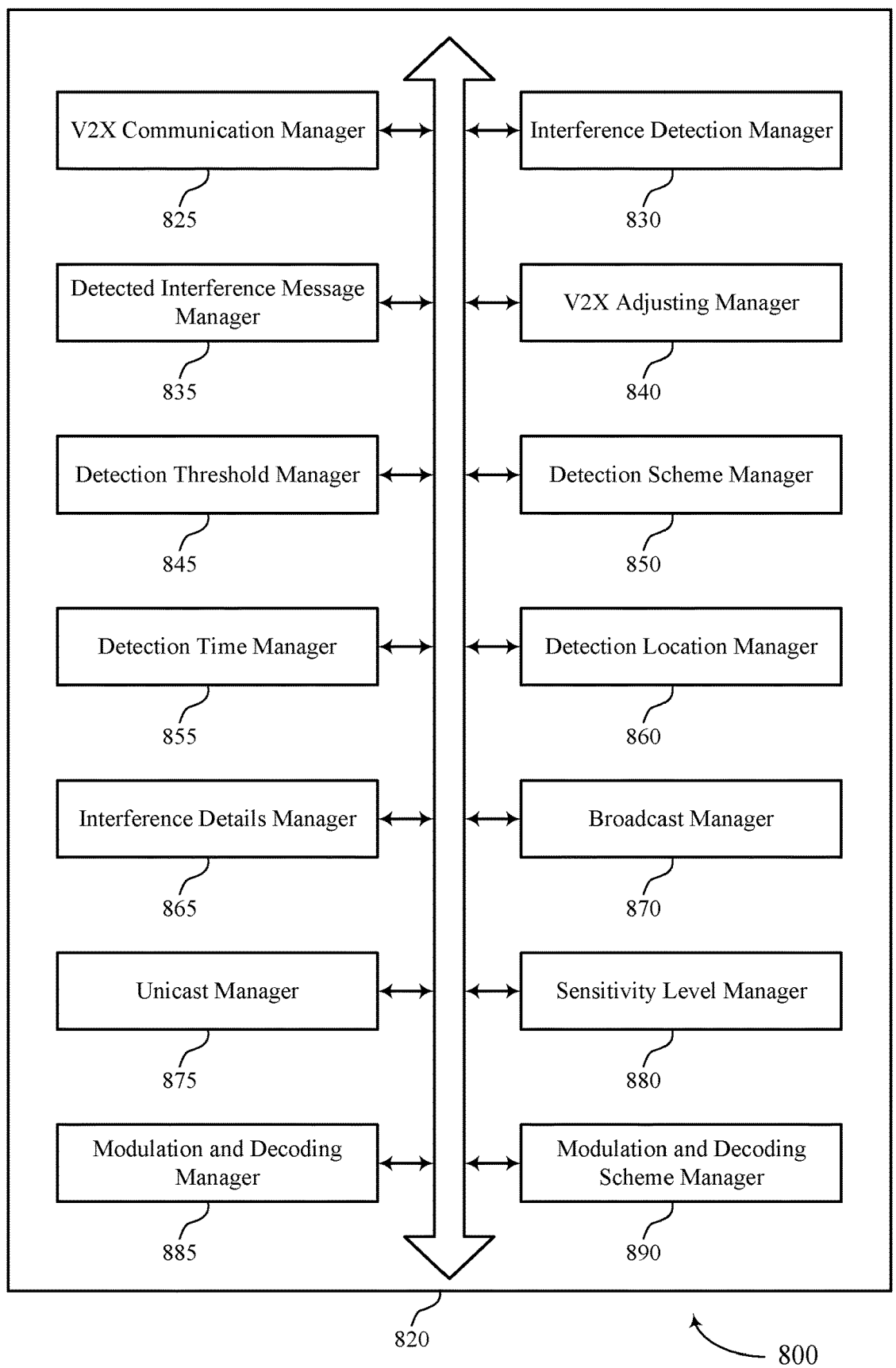
FIG. 8 illustrates a block diagram of a communications manager that supports sensor sharing of Wi-Fi interference detection in accordance with one or more aspects of the present disclosure.

FIG. 8 illustrates a block diagram 800 of a communications manager 820 that supports sensor sharing of Wi-Fi interference detection in accordance with one or more aspects of the present disclosure. The communications manager 820 may be an example of aspects of a communications manager 620, a communications manager 720, or both, as described herein. The communications manager 820, or various components thereof, may be an example of means for performing various aspects of sensor sharing of Wi-Fi interference detection as described herein. For example, the communications manager 820 may include a V2X communication manager 825, an interference detection manager 830, a detected interference message manager 835, a V2X adjusting manager 840, a detection threshold manager 845, a detection scheme manager 850, a detection time manager 855, a detection location manager 860, an interference details manager 865, a broadcast manager 870, a unicast manager 875, a sensitivity level manager 880, a modulation and decoding manager 885, a modulation and decoding scheme manager 890, or any combination thereof. Each of these components may communicate, directly or indirectly, with one another (e.g., via one or more buses).

The communications manager 820 may support wireless communications at a first UE in accordance with examples as disclosed herein. The V2X communication manager 825 may be configured as or otherwise support a means for communicating with a second UE via a V2X communication link. The interference detection manager 830 may be configured as or otherwise support a means for detecting RF interference with respect to the V2X communication link. The detected interference message manager 835 may be configured as or otherwise support a means for transmitting, to the second UE via the V2X communication link, a message including an indication of the detected RF interference and an indication of one or more characteristics of the detected RF interference.

In some examples, to support detecting the interference, the detection threshold manager 845 may be configured as or otherwise support a means for determining that the RF interference strength exceeds a threshold level, and where the one or more characteristics includes the threshold level.

In some examples, to support transmitting the message, the detection scheme manager 850 may be configured as or otherwise support a means for transmitting the message including an indication of an interference detection scheme used to detect the RF interference.

In some examples, to support transmitting the message including the indication of the one or more characteristics, the detection time manager 855 may be configured as or otherwise support a means for transmitting the message indicating a time corresponding to detection of the RF interference.

In some examples, to support transmitting the message including the indication of the one or more characteristics, the detection location manager 860 may be configured as or otherwise support a means for transmitting the message indicating of a location of the first UE when the RF interference was detected.

In some examples, to support transmitting the message including the indication of the one or more characteristics, the interference details manager 865 may be configured as or otherwise support a means for transmitting the message indicating a power, rate, duration, frequency, or combination thereof of the detected RF interference.

In some examples, to support transmitting the message, the broadcast manager 870 may be configured as or otherwise support a means for broadcasting the message.

In some examples, to support transmitting the message, the unicast manager 875 may be configured as or otherwise support a means for unicasting the message to the second UE.

In some examples, the V2X adjusting manager 840 may be configured as or otherwise support a means for adjusting communications via the V2X communication link based on detecting the RF interference.

In some examples, to support adjusting communications via the V2X communication link, the sensitivity level manager 880 may be configured as or otherwise support a means for decreasing a threshold sensitivity level associated with an interference detection scheme.

In some examples, to support adjusting communications via the V2X communication link, the modulation and decoding scheme manager 890 may be configured as or otherwise support a means for selecting a modulation and decoding scheme for the V2X communication link.

In some examples, the detected interference message manager 835 may be configured as or otherwise support a means for receiving, prior to detecting the RF interference, a second message from one of the second UE or a third UE indicating that the one of the second UE or the third UE detected RF interference with the V2X communication link. In some examples, the detection threshold manager 845 may be configured as or otherwise support a means for decreasing a threshold level associated with detection of RF interference, where detecting the RF interference includes detecting RF interference in accordance with the decreased threshold level.

In some examples, the RF interference is detected within a bandwidth of the V2X communication link from an emission outside of the bandwidth.

Additionally, or alternatively, the communications manager 820 may support wireless communications at a second UE in accordance with examples as disclosed herein. In some examples, the V2X communication manager 825 may be configured as or otherwise support a means for communicating with a first UE via a V2X communication link. In some examples, the detected interference message manager 835 may be configured as or otherwise support a means for receiving, from the first UE via the V2X communication link, a message including an indication of detected RF interference with respect to the V2X communication link at the first UE and an indication of one or more characteristics of the detected RF interference. The V2X adjusting manager 840 may be configured as or otherwise support a means for adjusting communications via the V2X communication link based on the message.

In some examples, the interference detection manager 830 may be configured as or otherwise support a means for detecting RF interference with the V2X communication link, where adjusting communications is based on detecting the RF interference.

In some examples, to support receiving the message including the indication of the one or more characteristics, the detection threshold manager 845 may be configured as or otherwise support a means for receiving the message indicating a threshold level for detection of the RF interference at the first UE.

In some examples, to support receiving the message, the detection scheme manager 850 may be configured as or otherwise support a means for receiving the message including an indication of an interference detection scheme used to detect the RF interference.

In some examples, to support receiving the message including the indication of the one or more characteristics, the detection time manager 855 may be configured as or otherwise support a means for receiving the message indicating a time corresponding to detection of the RF interference.

In some examples, to support receiving the message including the indication of the one or more characteristics, the detection location manager 860 may be configured as or otherwise support a means for receiving the message indicating of a location of the first UE when the RF interference was detected.

In some examples, to support receiving the message including the indication of the one or more characteristics, the interference details manager 865 may be configured as or otherwise support a means for receiving the message indicating a power, rate, duration, frequency, or combination thereof of the detected RF interference.

In some examples, to support adjusting communications via the V2X communication link, the sensitivity level manager 880 may be configured as or otherwise support a means for decreasing a threshold sensitivity level associated with an interference detection scheme.

In some examples, to support adjusting communications via the V2X communication link, the modulation and decoding manager 885 may be configured as or otherwise support a means for selecting a modulation and decoding scheme for the V2X communication link.

In some examples, the RF interference is detected within a bandwidth of the V2X communication link from an emission outside of the bandwidth.

Figure 9:
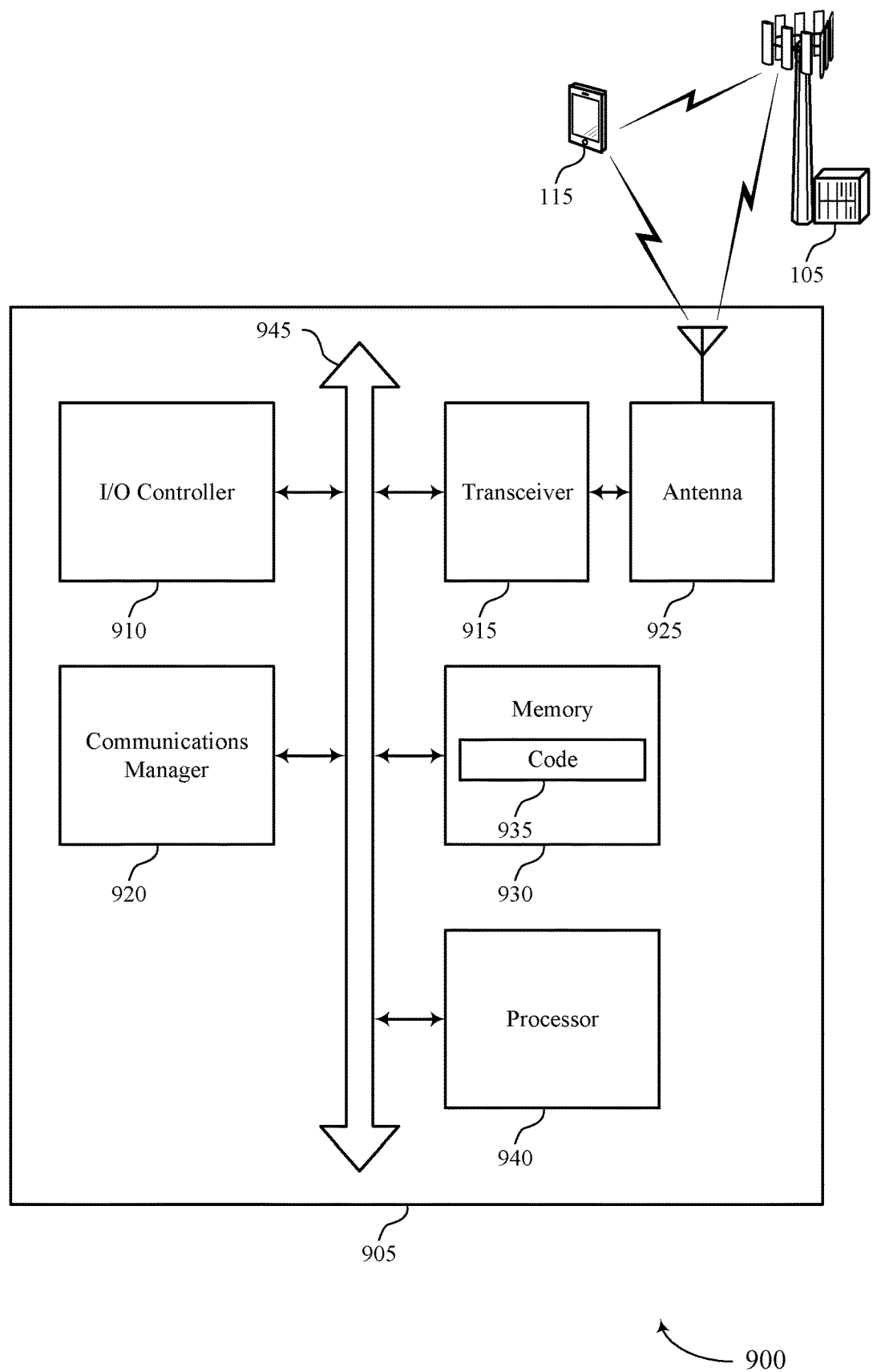
FIG. 9 illustrates a diagram of a system including a device that supports sensor sharing of Wi-Fi interference detection in accordance with one or more aspects of the present disclosure.

FIG. 9 illustrates a diagram of a system 900 including a device 905 that supports sensor sharing of Wi-Fi interference detection in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting sensor sharing of Wi-Fi interference detection). For example, the device 905 or a component of the device 905 may include a processor 940 and memory 930 coupled with or to the processor 940, the processor 940 and memory 930 configured to perform various functions described herein.

The communications manager 920 may support wireless communications at a first UE in accordance with examples as disclosed herein. For example, the communications manager 920 may be configured as or otherwise support a means for communicating with a second UE via a V2X communication link. The communications manager 920 may be configured as or otherwise support a means for detecting RF interference with the V2X communication link. The communications manager 920 may be configured as or otherwise support a means for transmitting, to the second UE via the V2X communication link, a message including an indication of the detected RF interference and an indication of one or more characteristics of the detected RF interference.

Additionally, or alternatively, the communications manager 920 may support wireless communications at a second UE in accordance with examples as disclosed herein. For example, the communications manager 920 may be configured as or otherwise support a means for communicating with a first UE via a V2X communication link. The communications manager 920 may be configured as or otherwise support a means for receiving, from the first UE via the V2X communication link, a message including an indication of detected RF interference with respect to the V2X communication link at the first UE and an indication of one or more characteristics of the detected RF interference. The communications manager 920 may be configured as or otherwise support a means for adjusting communications via the V2X communication link based on the message.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of sensor sharing of Wi-Fi interference detection as described herein, or the processor 940 and the memory 930 may be otherwise configured to perform or support such operations.

Figure 10:
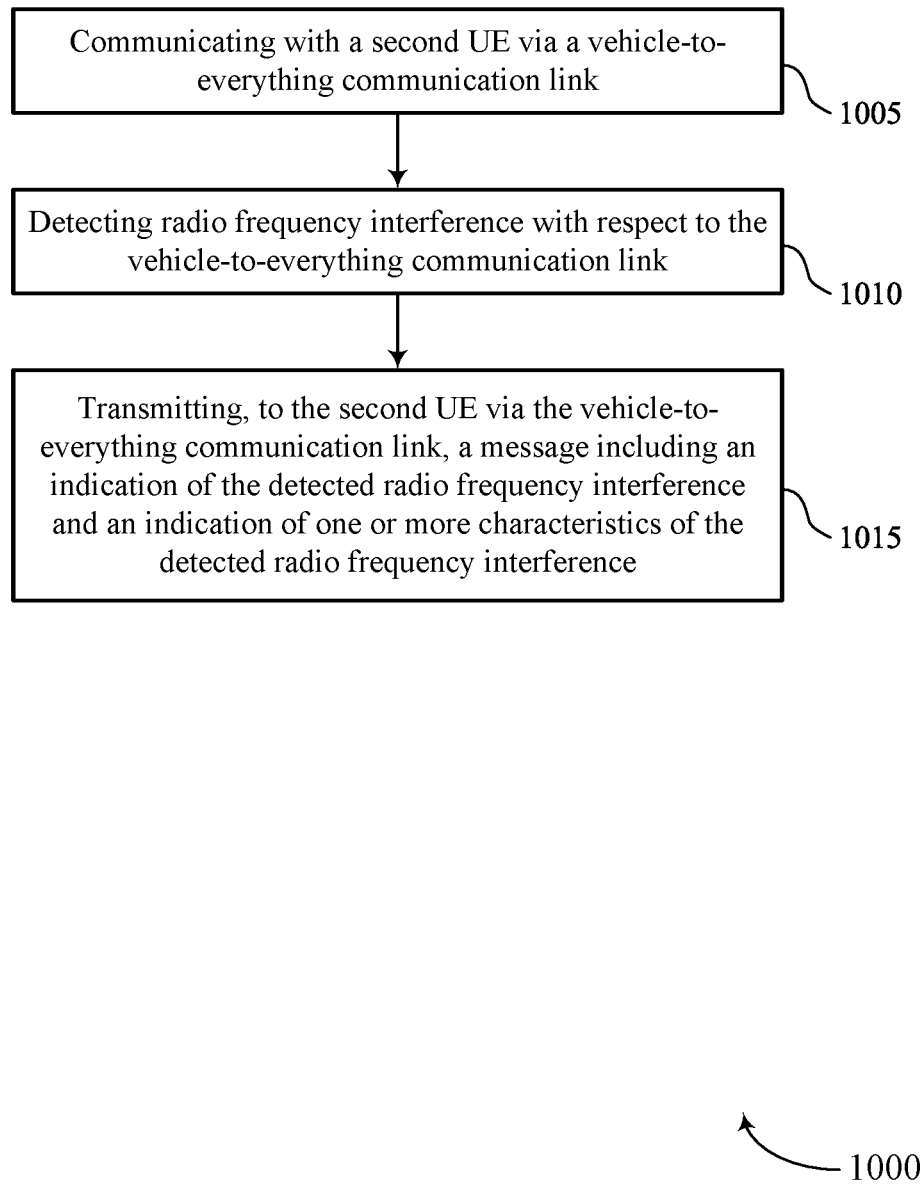
FIGS. 10 through 12 illustrate flowcharts showing methods that support sensor sharing of Wi-Fi interference detection in accordance with one or more aspects of the present disclosure.

FIG. 10 illustrates a flowchart illustrating a method 1000 that supports sensor sharing of Wi-Fi interference detection in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include communicating with a second UE via a V2X communication link. The operations of 1005 may be performed in accordance with examples as disclosed herein. In some examples, aspects of the operations of 1005 may be performed by a V2X communication manager 825 as described with reference to FIG. 8.

At 1010, the method may include detecting RF interference with respect to the V2X communication link. The operations of 1010 may be performed in accordance with examples as disclosed herein. In some examples, aspects of the operations of 1010 may be performed by an interference detection manager 830 as described with reference to FIG. 8.

At 1015, the method may include transmitting, to the second UE via the V2X communication link, a message including an indication of the detected RF interference and an indication of one or more characteristics of the detected RF interference. The operations of 1015 may be performed in accordance with examples as disclosed herein. In some examples, aspects of the operations of 1015 may be performed by a detected interference message manager 835 as described with reference to FIG. 8.

Figure 11:
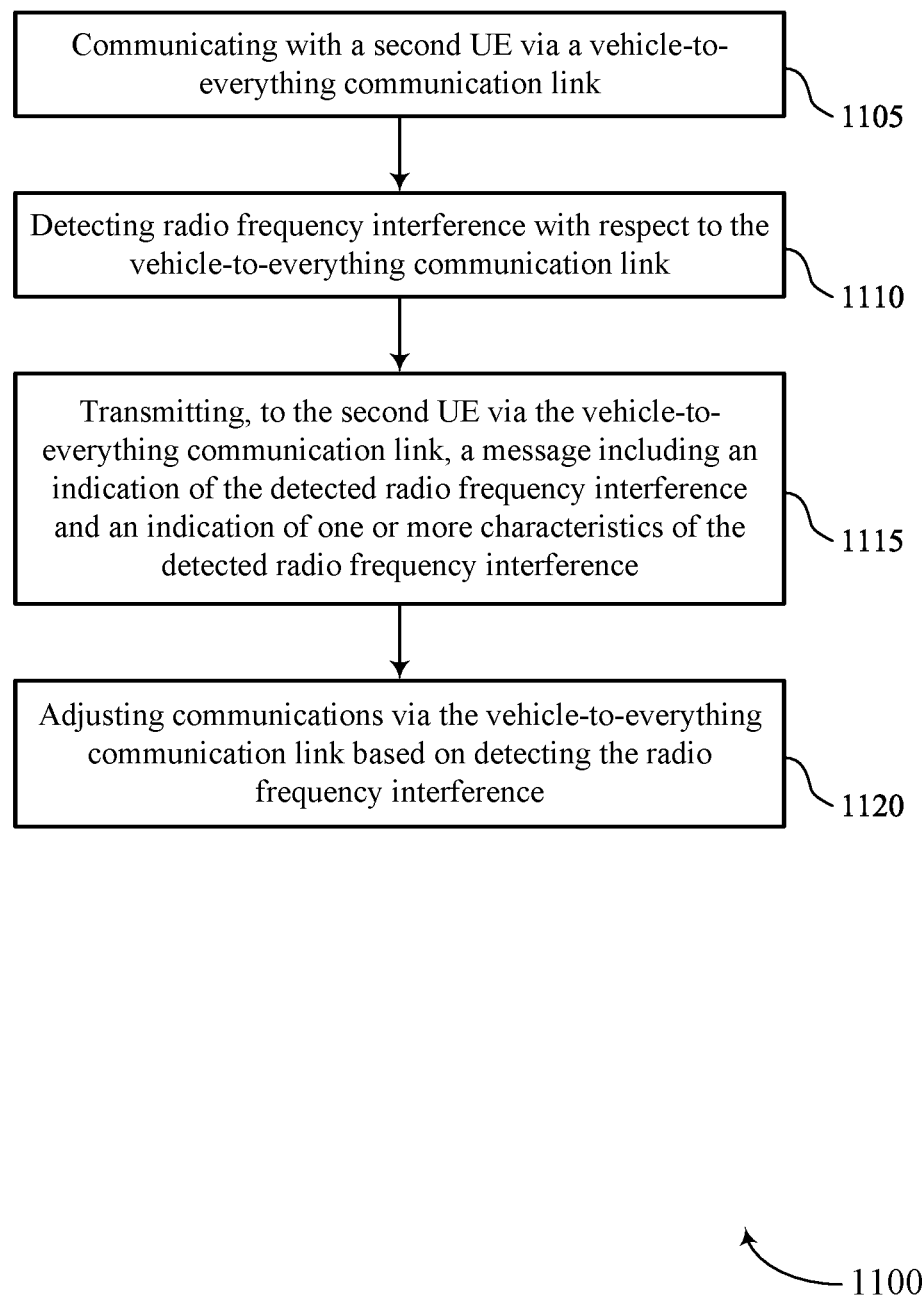

FIG. 11 illustrates a flowchart illustrating a method 1100 that supports sensor sharing of Wi-Fi interference detection in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include communicating with a second UE via a V2X communication link. The operations of 1105 may be performed in accordance with examples as disclosed herein. In some examples, aspects of the operations of 1105 may be performed by a V2X communication manager 825 as described with reference to FIG. 8.

At 1110, the method may include detecting RF interference with respect to the V2X communication link. The operations of 1110 may be performed in accordance with examples as disclosed herein. In some examples, aspects of the operations of 1110 may be performed by an interference detection manager 830 as described with reference to FIG. 8.

At 1115, the method may include transmitting, to the second UE via the V2X communication link, a message including an indication of the detected RF interference and an indication of one or more characteristics of the detected RF interference. The operations of 1115 may be performed in accordance with examples as disclosed herein. In some examples, aspects of the operations of 1115 may be performed by a detected interference message manager 835 as described with reference to FIG. 8.

At 1120, the method may include adjusting communications via the V2X communication link based on detecting the RF interference. The operations of 1120 may be performed in accordance with examples as disclosed herein. In some examples, aspects of the operations of 1120 may be performed by a V2X adjusting manager 840 as described with reference to FIG. 8.

Figure 12:
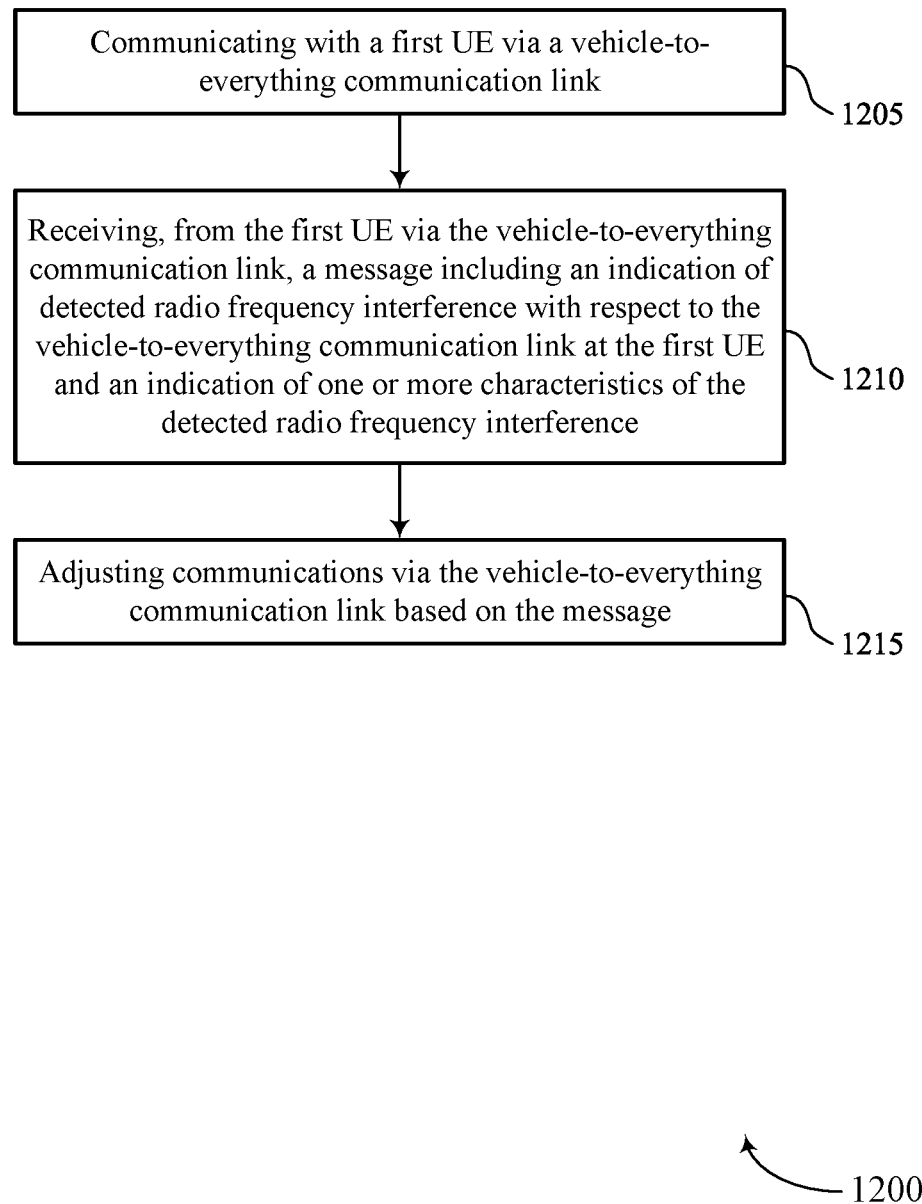

FIG. 12 illustrates a flowchart illustrating a method 1200 that supports sensor sharing of Wi-Fi interference detection in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include communicating with a first UE via a V2X communication link. The operations of 1205 may be performed in accordance with examples as disclosed herein. In some examples, aspects of the operations of 1205 may be performed by a V2X communication manager 825 as described with reference to FIG. 8.

At 1210, the method may include receiving, from the first UE via the V2X communication link, a message including an indication of detected RF interference with respect to the V2X communication link at the first UE and an indication of one or more characteristics of the detected RF interference. The operations of 1210 may be performed in accordance with examples as disclosed herein. In some examples, aspects of the operations of 1210 may be performed by a detected interference message manager 835 as described with reference to FIG. 8.

At 1215, the method may include adjusting communications via the V2X communication link based on the message. The operations of 1215 may be performed in accordance with examples as disclosed herein. In some examples, aspects of the operations of 1215 may be performed by a V2X adjusting manager 840 as described with reference to FIG. 8.

The following provides an overview of aspects of the present disclosure:

Aspect 1: A method for wireless communications at a first UE, comprising: communicating with a second UE via a V2X communication link; detecting RF interference with respect to the V2X communication link; and transmitting, to the second UE via the V2X communication link, a message including an indication of the detected RF interference and an indication of one or more characteristics of the detected RF interference.

Aspect 2: The method of aspect 1, wherein detecting the interference comprises: determining that an RF interference strength exceeds a threshold level, and wherein the one or more characteristics comprises the threshold level.

Aspect 3: The method of any of aspects 1 through 2, wherein transmitting the message comprises: transmitting the message including an indication of an interference detection scheme used to detect the RF interference.

Aspect 4: The method of any of aspects 1 through 3, wherein transmitting the message including the indication of the one or more characteristics comprises: transmitting the message indicating a time corresponding to detection of the RF interference.

Aspect 5: The method of any of aspects 1 through 4, wherein transmitting the message including the indication of the one or more characteristics comprises: transmitting the message indicating of a location of the first UE when the RF interference was detected.

Aspect 6: The method of any of aspects 1 through 5, wherein transmitting the message including the indication of the one or more characteristics comprises: transmitting the message indicating a power, rate, duration, frequency, or combination thereof of the detected RF interference.

Aspect 7: The method of any of aspects 1 through 6, wherein transmitting the message comprises: broadcasting the message.

Aspect 8: The method of any of aspects 1 through 6, wherein transmitting the message comprises: unicasting the message to the second UE.

Aspect 9: The method of any of aspects 1 through 8, further comprising: adjusting communications via the V2X communication link based at least in part on detecting the RF interference.

Aspect 10: The method of aspect 9, wherein adjusting communications via the V2X communication link comprises: decreasing a threshold sensitivity level associated with an interference detection scheme.

Aspect 11: The method of any of aspects 9 through 10, wherein adjusting communications via the V2X communication link comprises: selecting a modulation and decoding scheme for the V2X communication link.

Aspect 12: The method of any of aspects 1 through 11, further comprising: receiving, prior to detecting the RF interference, a second message from one of the second UE or a third UE indicating that the one of the second UE or the third UE detected RF interference with the V2X communication link; and decreasing a threshold level associated with detection of RF interference, wherein detecting the RF interference comprises detecting RF interference in accordance with the decreased threshold level.

Aspect 13: The method of any of aspects 1 through 12, wherein the RF interference is detected within a bandwidth of the V2X communication link from an emission outside of the bandwidth.

Aspect 14: A method for wireless communications at a second UE, comprising: communicating with a first UE via a V2X communication link; receiving, from the first UE via the V2X communication link, a message including an indication of detected RF interference with the V2X communication link at the first UE and an indication of one or more characteristics of the detected RF interference; and adjusting communications via the V2X communication link based at least in part on the message.

Aspect 15: The method of aspect 14, further comprising: detecting RF interference with the V2X communication link, wherein adjusting communications is based at least in part on detecting the RF interference.

Aspect 16: The method of any of aspects 14 through 15, wherein receiving the message including the indication of the one or more characteristics comprises: receiving the message indicating a threshold level for detection of the RF interference at the first UE.

Aspect 17: The method of any of aspects 14 through 16, wherein receiving the message comprises: receiving the message including an indication of an interference detection scheme used to detect the RF interference.

Aspect 18: The method of any of aspects 14 through 17, wherein receiving the message including the indication of the one or more characteristics comprises: receiving the message indicating a time corresponding to detection of the RF interference.

Aspect 19: The method of any of aspects 14 through 18, wherein receiving the message including the indication of the one or more characteristics comprises: receiving the message indicating of a location of the first UE when the RF interference was detected.

Aspect 20: The method of any of aspects 14 through 19, wherein receiving the message including the indication of the one or more characteristics comprises: receiving the message indicating a power, rate, duration, frequency, or combination thereof of the detected RF interference.

Aspect 21: The method of any of aspects 14 through 20, wherein adjusting communications via the V2X communication link comprises: decreasing a threshold sensitivity level associated with an interference detection scheme.

Aspect 22: The method of any of aspects 14 through 21, wherein adjusting communications via the V2X communication link comprises: selecting a modulation and decoding scheme for the V2X communication link.

Aspect 23: The method of any of aspects 14 through 22, wherein the RF interference is detected within a bandwidth of the V2X communication link from an emission outside of the bandwidth.

Aspect 24: An apparatus for wireless communications at a first UE, comprising a processor; memory coupled with the processor; and instructions stored in the memory and executable by the processor to cause the apparatus to perform a method of any of aspects 1 through 13.

Aspect 25: An apparatus for wireless communications at a first UE, comprising at least one means for performing a method of any of aspects 1 through 13.

Aspect 26: A non-transitory computer-readable medium storing code for wireless communications at a first UE, the code comprising instructions executable by a processor to perform a method of any of aspects 1 through 13.

Aspect 27: An apparatus for wireless communications at a second UE, comprising a processor; memory coupled with the processor; and instructions stored in the memory and executable by the processor to cause the apparatus to perform a method of any of aspects 14 through 23.

Aspect 28: An apparatus for wireless communications at a second UE, comprising at least one means for performing a method of any of aspects 14 through 23.

Aspect 29: A non-transitory computer-readable medium storing code for wireless communications at a second UE, the code comprising instructions executable by a processor to perform a method of any of aspects 14 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Wi-Fi, IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first user equipment (UE), comprising:
    communicating with a second UE via a vehicle-to-everything communication link;
    detecting radio frequency interference with respect to the vehicle-to-everything communication link, wherein a radio frequency interference strength exceeds a threshold level; and
    transmitting, to the second UE via the vehicle-to-everything communication link, a message including an indication of the detected radio frequency interference and an indication of one or more characteristics of the detected radio frequency interference, wherein the one or more characteristics comprises the threshold level.

2. The method of claim 1, wherein transmitting the message comprises:
transmitting the message including an indication of an interference detection scheme used to detect the radio frequency interference.

3. The method of claim 1, wherein transmitting the message including the indication of the one or more characteristics comprises:
transmitting the message indicating a time corresponding to detection of the radio frequency interference.

4. The method of claim 1, wherein transmitting the message including the indication of the one or more characteristics comprises:
transmitting the message indicating of a location of the first UE when the radio frequency interference was detected.

5. The method of claim 1, wherein transmitting the message including the indication of the one or more characteristics comprises:
transmitting the message indicating a power, rate, duration, frequency, or combination thereof of the detected radio frequency interference.

6. The method of claim 1, wherein transmitting the message comprises:
broadcasting the message.

7. The method of claim 1, wherein transmitting the message comprises:
unicasting the message to the second UE.

8. The method of claim 1, further comprising:
adjusting communications via the vehicle-to-everything communication link based at least in part on detecting the radio frequency interference.

9. The method of claim 8, wherein adjusting communications via the vehicle-to-everything communication link comprises:
selecting a modulation and decoding scheme for the vehicle-to-everything communication link.

10. The method of claim 1, wherein adjusting communications via the vehicle-to-everything communication link comprises:
decreasing the threshold level associated with an interference detection scheme.

11. The method of claim 1, further comprising:
receiving, prior to detecting the radio frequency interference, a second message from one of the second UE or a third UE indicating that the one of the second UE or the third UE detected radio frequency interference with the vehicle-to-everything communication link; and
decreasing the threshold level associated with detection of radio frequency interference, wherein detecting the radio frequency interference comprises detecting radio frequency interference in accordance with the decreased threshold level.

12. The method of claim 1, wherein the radio frequency interference is detected within a bandwidth of the vehicle-to-everything communication link from an emission outside of the bandwidth.

13. The method of claim 1, wherein transmitting the message including the indication of the one or more characteristics comprises:
transmitting the message indicating a rate of the detected radio frequency interference.

14. An apparatus for wireless communications at a first user equipment (UE), comprising:
one or more memories storing processor-executable code; and
one or more processors coupled with the one or more memories and individually or collectively operable to execute the code to cause the apparatus to:
communicate with a second UE via a vehicle-to-everything communication link;
detect radio frequency interference with respect to the vehicle-to-everything communication link, wherein a radio frequency interference strength exceeds a threshold level; and
transmit, to the second UE via the vehicle-to-everything communication link, a message including an indication of the detected radio frequency interference and an indication of one or more characteristics of the detected radio frequency interference, wherein the one or more characteristics comprises the threshold level.

15. The apparatus of claim 14, wherein, to transmit the message, the one or more processors are operable to cause the apparatus to:
transmit the message including an indication of an interference detection scheme used to detect the radio frequency interference, a time corresponding to detection of the radio frequency interference, a location of the first UE when the radio frequency interference was detected, or combination thereof.

16. The apparatus of claim 14, wherein, to transmit the message, the one or more processors are operable to cause the apparatus to:
transmit the message indicating a power, rate, duration, frequency, or combination thereof of the detected radio frequency interference.

17. The apparatus of claim 14, wherein, to transmit the message, the one or more processors are operable to cause the apparatus to:
transmit the message including an indication of an interference detection scheme used to detect the radio frequency interference.

18. The apparatus of claim 14, wherein, to transmit the message, the one or more processors are operable to cause the apparatus to:
transmit the message indicating a time corresponding to detection of the radio frequency interference.

19. The apparatus of claim 14, wherein, to transmit the message, the one or more processors are operable to cause the apparatus to:
transmit the message indicating of a location of the first UE when the radio frequency interference was detected.

20. The apparatus of claim 14, wherein, to transmit the message, the one or more processors are operable to cause the apparatus to:
broadcast the message.

21. The apparatus of claim 14, wherein, to transmit the message, the one or more processors are operable to cause the apparatus to:
unicast the message to the second UE.

22. The apparatus of claim 14, wherein the one or more processors are individually or collectively further operable to execute the code to cause the apparatus to:
adjust communications via the vehicle-to-everything communication link based at least in part on detecting the radio frequency interference.

23. The apparatus of claim 22, wherein, to adjust communications, the one or more processors are operable to cause the apparatus to:

decrease the threshold level associated with an interference detection scheme.

24. The apparatus of claim 22, wherein, to adjust communications, the one or more processors are operable to cause the apparatus to:
   select a modulation and decoding scheme for the vehicle-to-everything communication link.

25. The apparatus of claim 14, wherein the one or more processors are individually or collectively further operable to execute the code to cause the apparatus to:
   receive, prior to detecting the radio frequency interference, a second message from one of the second UE or a third UE indicating that the one of the second UE or the third UE detected radio frequency interference with the vehicle-to-everything communication link; and
   decrease the threshold level associated with detection of radio frequency interference, wherein detecting the radio frequency interference comprises detecting radio frequency interference in accordance with the decreased threshold level.

26. The apparatus of claim 14, wherein the radio frequency interference is detected within a bandwidth of the vehicle-to-everything communication link from an emission outside of the bandwidth.

27. The apparatus of claim 14, wherein, to transmit the message, the one or more processors are operable to cause the apparatus to:
   transmit the message indicating a rate of the detected radio frequency interference.

* * * * *